Patented Apr. 24, 1928.

1,666,976

UNITED STATES PATENT OFFICE.

JOHN B. NEUENDORFF, OF SAN ANTONIO, TEXAS.

GASOLINE SUBSTITUTE AND PROCESS OF MAKING.

No Drawing. Substitute for application Serial No. 473,382, filed May 18, 1921. This application filed August 6, 1926. Serial No. 127,705.

The present invention relates to novel gasoline substitutes, and to the process of preparing such material in an economical manner, and the primary object of the invention is to provide a treatment of kerosene and other petroleum distillates, for producing a gasoline substitute which will be far superior to ordinary gasoline of the commercial grade, for use in internal combustion engines such as the engines of automobiles and the like.

The preferred treatment of the kerosene, gasoline, naphtha, "distillate oil", and other ingredients is by means of clear lime water. Clear lime water is produced as follows: One quart of lime is added to a gallon or more of water, the mixture stirred until the lime has wholly slaked and disintegrated, the vessel containing the mixture is then corked or sealed air-tight, and the mixture allowed to stand, and settle, producing saturated clear lime water, which can be siphoned off and corked up. More water is then added to the lime and this operation can be repeated for fifteen or twenty times, after which more lime is added to make up for that which has been dissolved.

One of the preferred ingredients of the product is kerosene oil, testing about 45° Bé. 100 volumes of kerosene, preferably of the gravity above mentioned, is well agitated with 20 to 30 volumes of lime water, prepared as above described. The mixture is then allowed to stand and settle, when it will be noted that there is a sharp line of demarkation between the clear kerosene and the somewhat turbid lime water, and on top of the lime water will be found drops having the form of bubbles of cloudy appearance, these being composed of impurities which have been withdrawn from the kerosene by means of the lime water. Other impurities may have been withdrawn from the kerosene and dissolved in the lime water.

Gasoline, preferably high test gasoline, having a gravity of 65° Bé., or above, is purified by treatment with lime water, in the manner above described.

Naphtha, preferably having a gravity of about 58° Bé., is likewise purified by treatment with lime water. "Distillate" (a distillate from petroleum oil having a gravity of about 44° Bé.) is purified in a similar manner.

A mixture or blend is then produced, by mixing any two or more of the above purified ingredients, which blend is preferably also subsequently purified by means described below. As a specific example, a mixture of 3 pints of purified high test gasoline of 65° Bé., purified in the manner above described, is mixed with kerosene purified as above described, and it will be found that the gravity of the product is about 50 to 55° Bé. In another example, about 1 part by volume of gasoline was mixed with 3 parts by volume of kerosene, both having been purified in the manner described above.

In another example about 3 parts by volume of gasoline were mixed with about 5 parts by volume of naphtha (gravity about 58° Bé.) and the mixture purified by treatment with dilute lime water.

In another example about 3 parts by volume of gasoline was mixed with 5 parts by volume of "distillate" of the character above specified, and the resulting mixture purified with dilute lime water.

In all of these examples, the mixtures gave very much better mileage per gallon than could be obtained with ordinary gasoline in the same automobile. As an example of the improvement, I will state that while the gasoline alone gave between fourteen and fifteen miles per gallon, the same gasoline, after purification with lime water as above described, gave between twenty-five and thirty miles per gallon. The mixture of kerosene and gasoline as above described gave over twenty miles per gallon in the same automobile.

The various blends produced as above described are preferably subjected to a further purification, this further purification consisting of agitation for fifteen or twenty minutes with lime water of a reduced concentration, namely, lime water preferably about one-half saturated. After agitation, the mixture is allowed to stand and settle and the lime water separated from the blend.

The blend produced as above described should in all cases have a gravity between 50 and 55° Bé., a gravity of above 55° Bé., being unnecessary, as there is a surplus of vaporization therein for the production of normal ignition in an ordinary automobile engine. Mixtures having a gravity below 50° Bé., are likely not to give a sufficient amount of vaporization to use in ordinary automobile engines.

The final mixture may, if desired, have a third washing in a washer (and then treated in a centrifugal separator) with lime water of about the same concentration as that used in the second step, namely, about one-half saturated.

I have clearly demonstrated in tests which I have made, that the mileage per gallon can be readily increased by about twelve to fifteen miles by the use of the lime water treatment.

The lime water treatment may be applied to crude or unpurified gasoline, kerosene and the other oils mentioned, or the same can, if desired, be first subjected to ordinary refining, such as the sulfuric acid and alkali treatment, which is well known in the art, and subsequently subjected to treatment with lime water, as above described.

The increase in mileage is not entirely produced by the blending, as is demonstrated by the fact that commercial gasoline, when purified by the clear lime water, has been shown to give a greatly incrased mileage per gallon. Thus, a particular commercial gasoline, purchased in the open market, gave about 14 to 15 miles per gallon without the lime water treatment, whereas the same gasoline, after treatment by the process, gave, in the same automobile, between 27 and 30 miles per gallon.

The sediment collected in the operation of treating the oil distillates with lime water, can be utilized for any desired purpose.

The use of lime water, as will be readily understood is far cheaper than the use of the common refining agents, used in the art, such as sulfuric acid and caustic soda.

The present application is a substitute for my earlier application, Ser. No. 473,382, filed May 18, 1921.

I claim:

1. A process of improving petroleum distillates for use in internal combustion engines which comprises subjecting the said distillates in a liquid state to the action of clear lime water.

2. A process which consists in subjecting oil distillates of different gravities in a liquid state to agitation with clear lime water, then blending the said distillates to produce a mixture having a gravity of between 50 and 55° Bé., and subsequently purifying such mixture by treating the same with a clear solution of lime in water.

3. A process which consists in subjecting petroleum oil distillates of different gravities in a liquid state to agitation with clear lime water, then blending the said distillates to produce a mixture having a gravity of between 50 and 55° Bé., and subsequently purifying such mixture by treating the same with a clear solution of lime in water, such second treatment being effected with lime water of a lower degree of concentration than that used in the first purification operation.

4. A process of treating hydrocarbon oil motor fuel ingredients which comprises agitating the same in a liquid state with clear lime water.

5. A motor fuel of about 55° Bé., gravity comprising mineral oil products washed in a liquid state with clear lime water.

6. A motor fuel blend of about 50 to 55° Bé., gravity comprising mixed mineral oil distillates separately washed with clear lime water.

7. A motor fuel composed substantially of hydrocarbons, treated with clear lime water, and having a specific gravity not higher than that of kerosene.

In testimony whereof I affix my signature.

JOHN B. NEUENDORFF.